(12) United States Patent
Cimadamore et al.

(10) Patent No.: US 11,347,661 B2
(45) Date of Patent: May 31, 2022

(54) TRANSITIONING BETWEEN THREAD-CONFINED MEMORY SEGMENT VIEWS AND SHARED MEMORY SEGMENT VIEWS

(71) Applicant: Oracle International Corporation, Redwood Shores, CA (US)

(72) Inventors: Maurizio Cimadamore, Donabate (IE); James Malcolm Laskey, Lunenburg (CA); Jorn Bender Vernee, Leiden (NL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/024,209

(22) Filed: Sep. 17, 2020

(65) Prior Publication Data

US 2021/0133121 A1    May 6, 2021

Related U.S. Application Data

(60) Provisional application No. 62/931,412, filed on Nov. 6, 2019.

(51) Int. Cl.
  *G06F 12/14* (2006.01)
  *G06F 12/06* (2006.01)

(52) U.S. Cl.
  CPC ...... *G06F 12/1458* (2013.01); *G06F 12/0646* (2013.01); *G06F 2212/1052* (2013.01)

(58) Field of Classification Search
  CPC ............. G06F 12/1458; G06F 12/0646; G06F 12/0284; G06F 12/1483; G06F 12/1441; G06F 2212/1052; G06F 2212/1016; G06F 2212/1032; G06F 2212/152
  See application file for complete search history.

(56) References Cited

U.S. PATENT DOCUMENTS

| | | | | |
|---|---|---|---|---|
| 3,794,821 A * | 2/1974 | Hodges | .................. | G06F 11/08 714/768 |
| 10,459,849 B1 * | 10/2019 | Shorb | .................. | G06F 9/5016 |
| 2007/0156973 A1 * | 7/2007 | Fleischer | .............. | G06F 12/109 711/147 |
| 2008/0086603 A1 * | 4/2008 | Lahtinen | ............. | G06F 12/0653 711/147 |
| 2016/0378976 A1 * | 12/2016 | Kotary | .................. | G06F 3/0655 713/193 |
| 2019/0332539 A1 * | 10/2019 | Anderson | ............... | G06F 3/065 |

* cited by examiner

*Primary Examiner* — Michael Krofcheck
(74) *Attorney, Agent, or Firm* — Invoke

(57) ABSTRACT

Techniques for transitioning between thread-confined memory segments and shared memory segments are disclosed. The system may instantiate a confined memory segment view. The confined memory segment view confines access to a memory segment to a particular thread. The system may further receive a request to change access permissions for the confined memory segment to allow access by a first set of one or more threads. Responsive to receiving the request to change access permissions for the confined memory segment, the system may instantiate a new memory segment view, wherein the new memory segment view permits access to the memory segment by the first set of one or more threads. The system may also copy metadata from the confined memory segment view to the new memory segment view. The system may de-allocate the memory segment in response to determining that there are no memory segment views associated with the memory segment.

22 Claims, 10 Drawing Sheets

TRANSITIONING BETWEEN THREAD-CONFINED MEMORY SEGMENT VIEWS AND SHARED MEMORY SEGMENT VIEWS

INCORPORATION BY REFERENCE; DISCLAIMER

This application is hereby incorporated by reference: application No. 62/931,412 filed on Nov. 6, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to accessing memory segments. In particular, the present disclosure relates to changing which threads are permitted to access a memory segment.

BACKGROUND

Native memory is memory available to a process, e.g. the Java process. Native memory is controlled by the operating system (OS) and based on physical memory and other physical devices, e.g. disks, flash memory, etc. A processor can access the memory via a memory bus. An amount of memory a CPU can access is based on the size of the physical address which the CPU uses to identify physical memory. If each memory area consists of 8 bytes then a 16-bit system can access 64 KB of memory and the 32-bit system can access 4 GB of memory.

An operating system (OS) normally uses virtual memory to map the physical memory to memory which each process can see. The OS assigns then memory to each process in a virtual memory space for this process and maps access to this virtual memory to the real physical memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
3. TRANSITIONING BETWEEN THREAD-CONFINED MEMORY SEGMENT VIEWS AND SHARED MEMORY SEGMENT VIEWS
    3.1 TYPES OF MEMORY SEGMENT VIEWS
    3.2 METHODS FOR TRANSITIONING BETWEEN THREAD-CONFINED MEMORY SEGMENT VIEWS AND SHARED MEMORY SEGMENT VIEWS
    3.3 EXAMPLE MEMORY SEGMENT VIEW OPERATIONS
4. MISCELLANEOUS; EXTENSIONS
5. HARDWARE OVERVIEW

1. General Overview

A system may include a memory segment view that is confined to access by a particular thread. That particular thread may seek to modify access permissions of the memory segment view such that additional and/or different thread(s) are permitted to access the memory referenced in the confined memory segment view. The system can allocate a new memory segment view, copy a reference to the physical memory segment from the confined memory segment view into the new memory segment view, and configure the new memory segment view to be accessible by those threads. The system can then provide a reference to the new memory segment view for use.

One or more embodiments described in this Specification and/or recited in the claims may not be included in this General Overview section.

2. Architectural Overview

Figure 1:
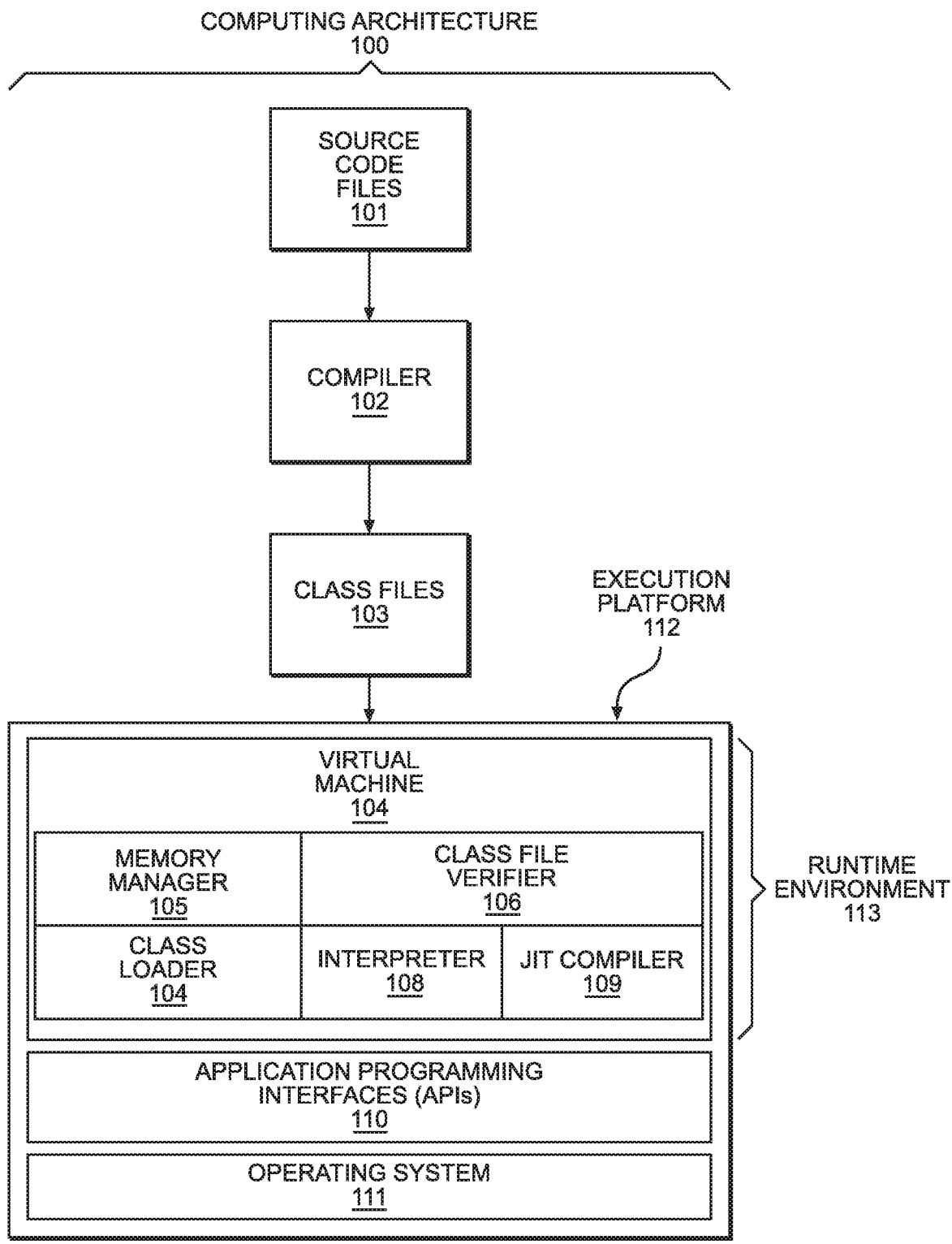
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
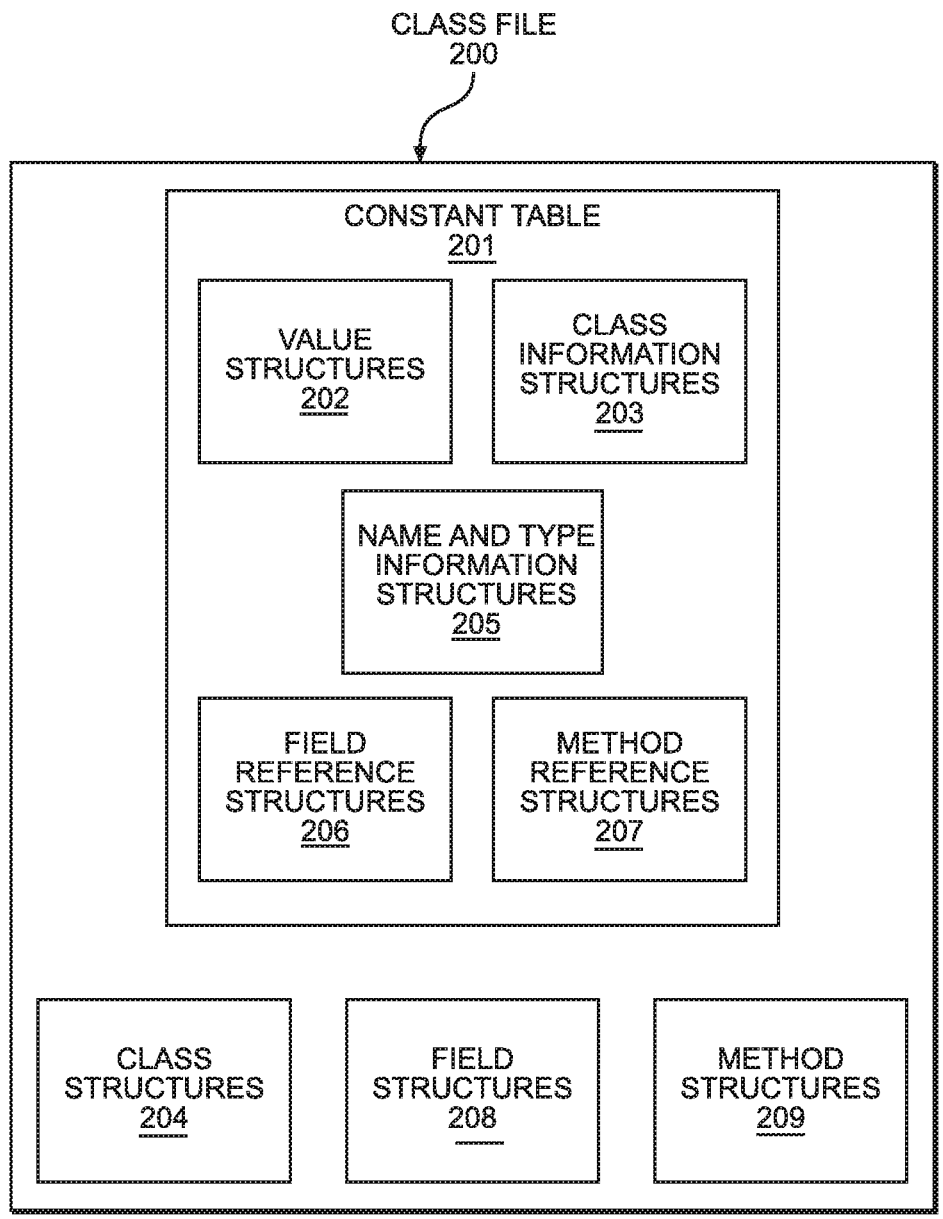
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
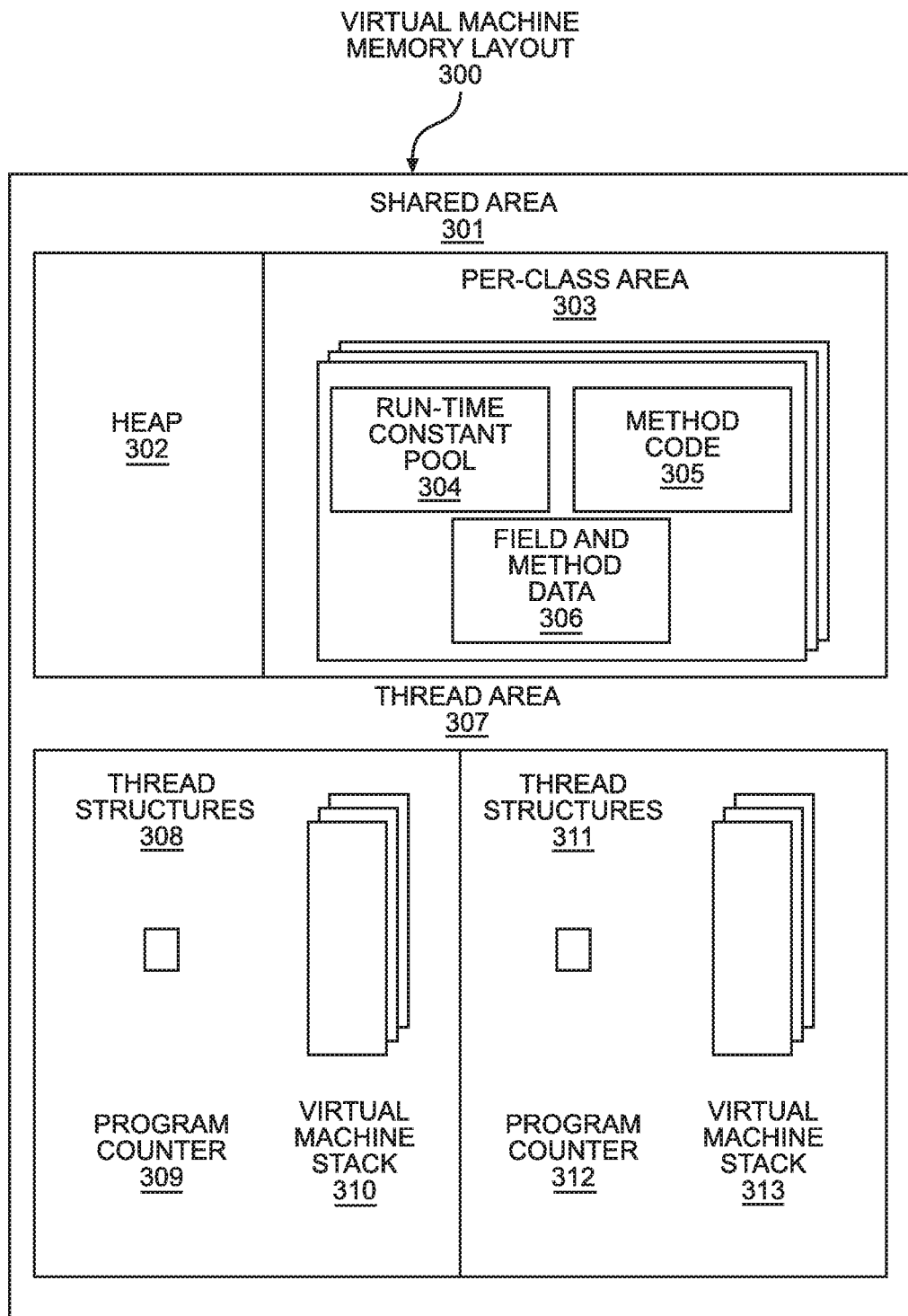
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
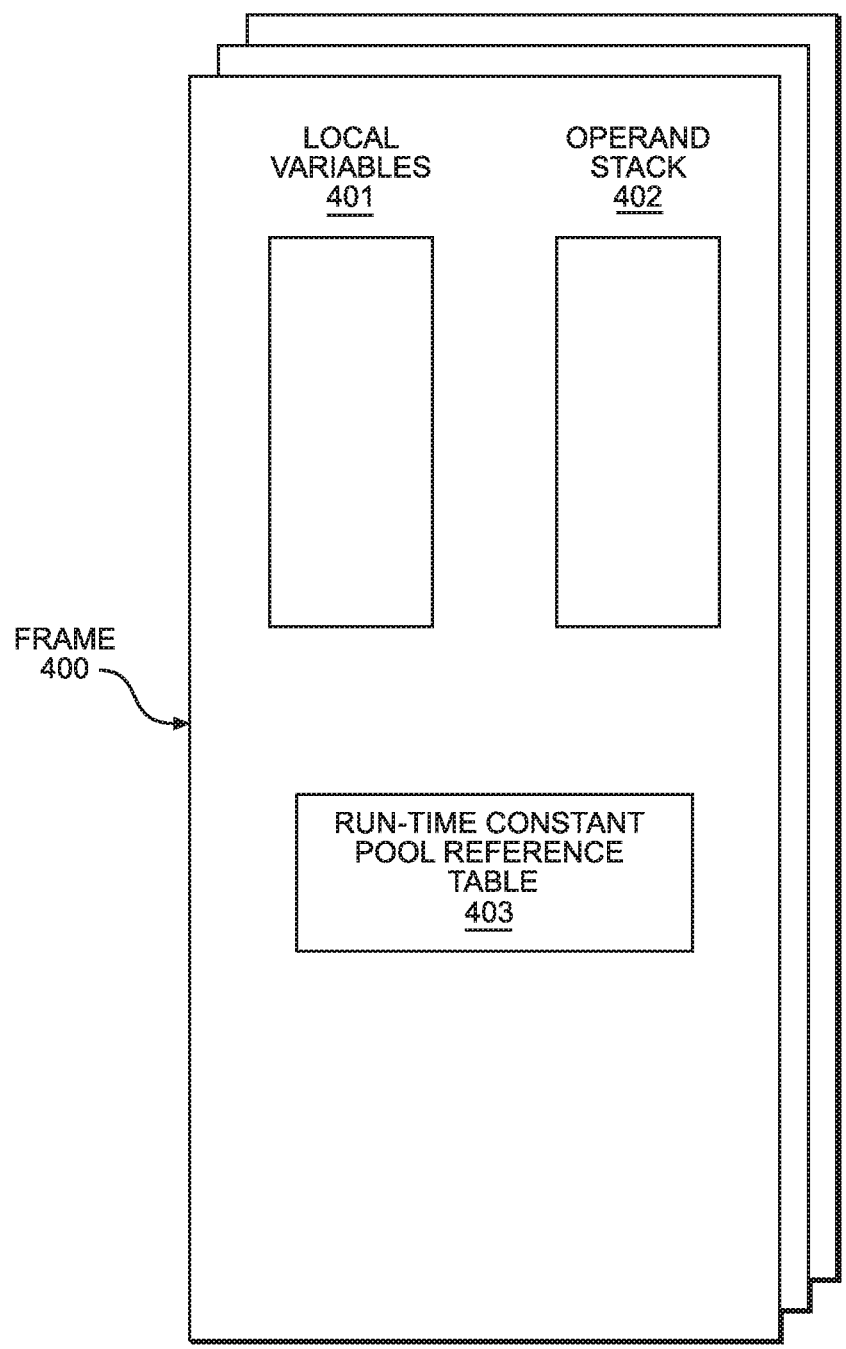
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Transitioning Between Thread-Confined Memory Segment Views and Shared Memory Segment Views A memory segment includes a set of bytes, each byte corresponding to a respective memory address. The memory segment may be referenced and accessed via a memory segment view. A memory segment view creates a view over a contiguous memory segment. The memory segment view includes particular spatial and temporal bounds. The memory segment view may specify spatial bounds of a memory segment (e.g. as the upper and lower memory address views which act as the segment bounds). The memory segment view may also specify temporal bounds of the memory segment (e.g., that the memory segment is created, used and then closed (e.g., de-allocated) when no longer in use). A memory segment view may further include a reference to a particular physical memory address of a memory segment. A memory address view includes a particular offset within a memory segment view. A memory address view may also specify a link to the memory segment view it refers to.

There are many ways in which a memory segment view can be instantiated and used to access the memory referenced by the view. There are many ways to allocate memory segments from a variety of sources. Once a memory segment view associated with the memory segment has been instantiated, a thread can access the memory segment view its associated memory segment view using various techniques. A memory segment may be de-allocated explicitly via an instruction from a thread to close a memory segment view, provided that there are no other memory segment views that reference the memory segment.

3.1 Types of Memory Segment Views

Figure 5:
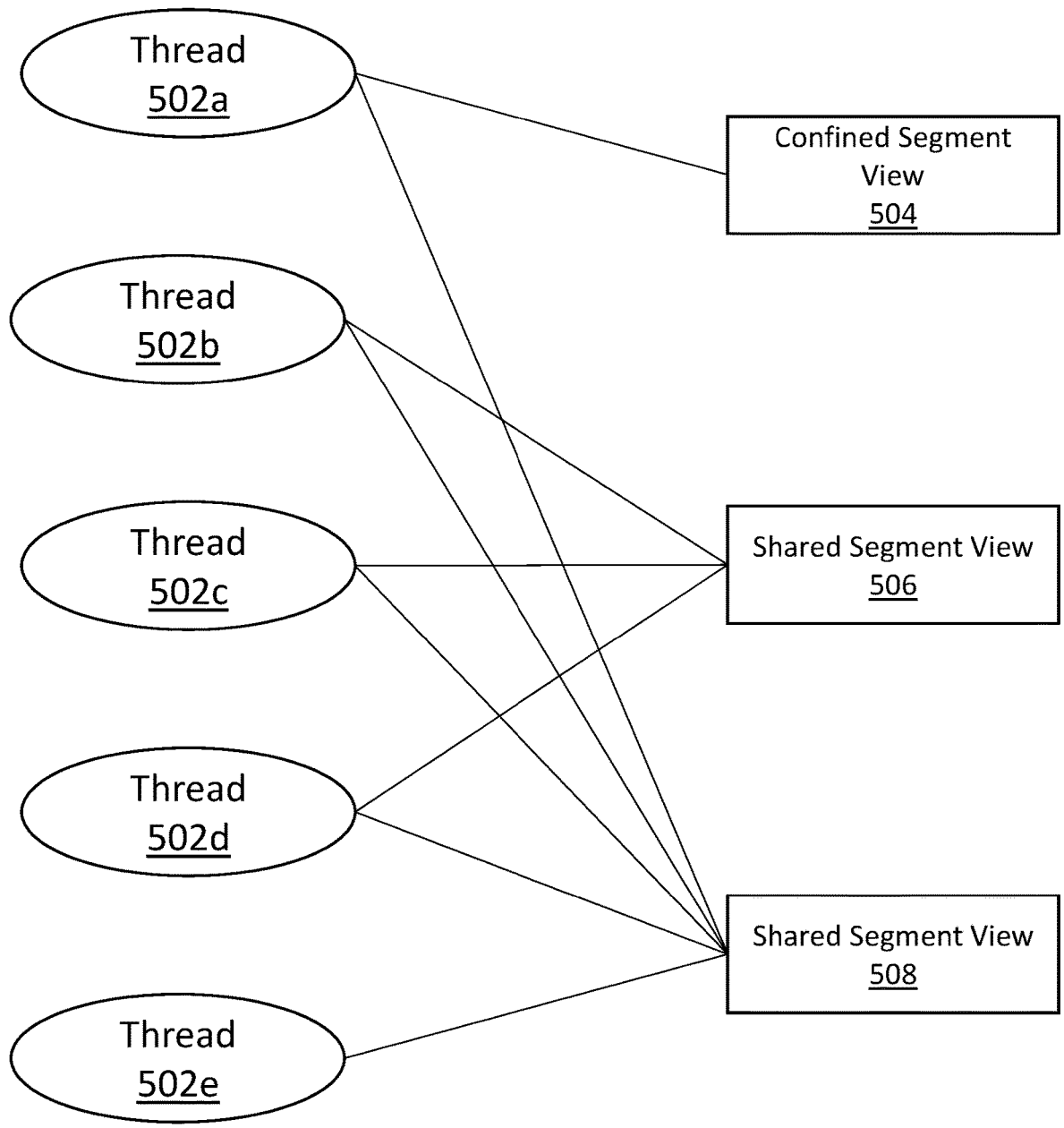
FIG. 5 illustrates a block diagram illustrating types of memory segments in accordance with one or more embodiments.

FIG. 5 shows a plurality of threads 502, and memory segment views 504, 506, and 508. Each of the memory segment views is accessible in a different way.

One form of memory access mode is thread confinement. In this mode, a memory segment view is associated with an owner thread that is established during instantiation of the memory segment view. The owner thread may be identified via a reference stored in the memory segment view itself. Alternatively, an owner thread may be identified in a mapping between memory segment views and owners that is external to the memory segment view. In some embodiments, threads can be statically confined, such that the owning thread is established once at instantiation and cannot be altered. That is, if thread A creates memory segment view S, we say that A owns S. This implies that no thread other than A can access and/or close the memory segment view. Furthermore, termination of an owner thread may be used to proactively deallocate the memory referenced by the confined memory segment view that was owned by the now-terminated thread.

This access mode is useful for a client which needs to perform some off-heap allocation in order to pass a struct to a native library. This access mode is useful for clients that need to serialize some complex Java object graph into native memory.

In other aspects, a memory segment view may be confined to access by a single thread (e.g., the memory segment has a single owner), but the owner may be changed over the life-cycle of the memory segment view. This leads to an access mode where multiple threads can access the same memory segment view, provided they do so one at a time.

Any thread that wants to access a memory segment view must acquire it first. If this operation is successful, the memory segment view goes into an acquired state, and cannot be claimed by a different thread. That is, the memory segment view will act as if it was statically confined to the thread which acquired it. Once a thread has finished working with the memory segment view, the thread can release the memory segment view, thus making the memory segment view available to other threads. A memory segment view may be closed only if the view is not owned by any thread.

This access mode is more flexible than its static counterpart, and may be useful when modeling producer/consumer use cases; that is, one thread acquires a memory segment view and writes data to the memory referenced by the memory segment view, then releases the memory segment view so that another thread can acquire the same memory segment view and read the data before releasing it again.

As an example, FIG. 5 shows memory segment view 504, which is a confined memory segment view that is owned by thread 502a. Thus, only thread 502a can access or close memory segment 504.

In other cases, it may be beneficial to share the same memory segment view across multiple threads in a way that makes it impossible for any of the threads accessing the shared memory segment view to do so after the memory segment view has already been closed by another thread.

A shared memory segment view starts off in a state where it is not owned by any thread. The shared memory segment view includes a field corresponding to an owner thread, the field may include a null value. Any thread that wants to access the memory referenced by the memory segment view needs to acquire it first. When a thread acquires the shared memory segment view, a new confined memory segment view that references the memory referenced in the shared memory segment view is instantiated, and the owner of the new confined memory segment view is set to the thread that acquired the shared memory segment view. Additionally, an acquisition counter associated with the shared memory segment view is incremented. When the thread releases the confined memory segment view, the acquisition counter associated with the shared memory segment view is decremented. Multiple threads may acquire the same shared memory segment view simultaneously. This means that, at any given point in time, a shared memory segment view can have zero, one, or many owning threads. As discussed above, a shared memory segment can only be closed if no thread has acquired it (e.g., the acquisition counter is zero). This is what makes accessing a shared memory segment safe.

When a memory segment view has multiple owners, it is possible for the threads owning it to perform racy read/write operations. That is, if a first thread attempts to perform a read access of the memory referenced by the memory segment view and a second thread simultaneously attempts to perform a write access operation on the same memory, the information read by the first thread may not reflect the information written to the segment by the second thread. Thus, while this model helps to ensure that no thread can access an already closed memory segment view, it does not guarantee correctness of access across multiple threads. That is, threads accessing the memory in a concurrent fashion must implement a synchronization strategy to help ensure correctness. This can be done using atomic operations (e.g. compare and swap), explicit read/write locks, and/or via any other known synchronization techniques.

This access mode is useful in a one-publisher/many-subscribers use case, where one thread writes to a memory segment, then makes the memory segment available for multiple threads to read, possibly in a concurrent fashion. Alternatively, this access mode is useful for an off-heap cache whose contents must be made available to more than just one thread at a time.

As an example, FIG. 5 shows a shared memory segment view 506 that has been acquired by threads 502b, 502c, and 502d. Thus, the threads 502b, 502c, and 502d can access the memory segment view 506. However, threads 502a and 502e are not able to access the memory segment view. Additionally, none of these threads are able to close the memory segment view 506 while any thread has acquired the memory segment. Additionally, FIG. 5 shows a shared memory segment view 508 that has been acquired by all threads 502. Thus, all threads 502 are able to access the memory segment view 508.

Figure 6:
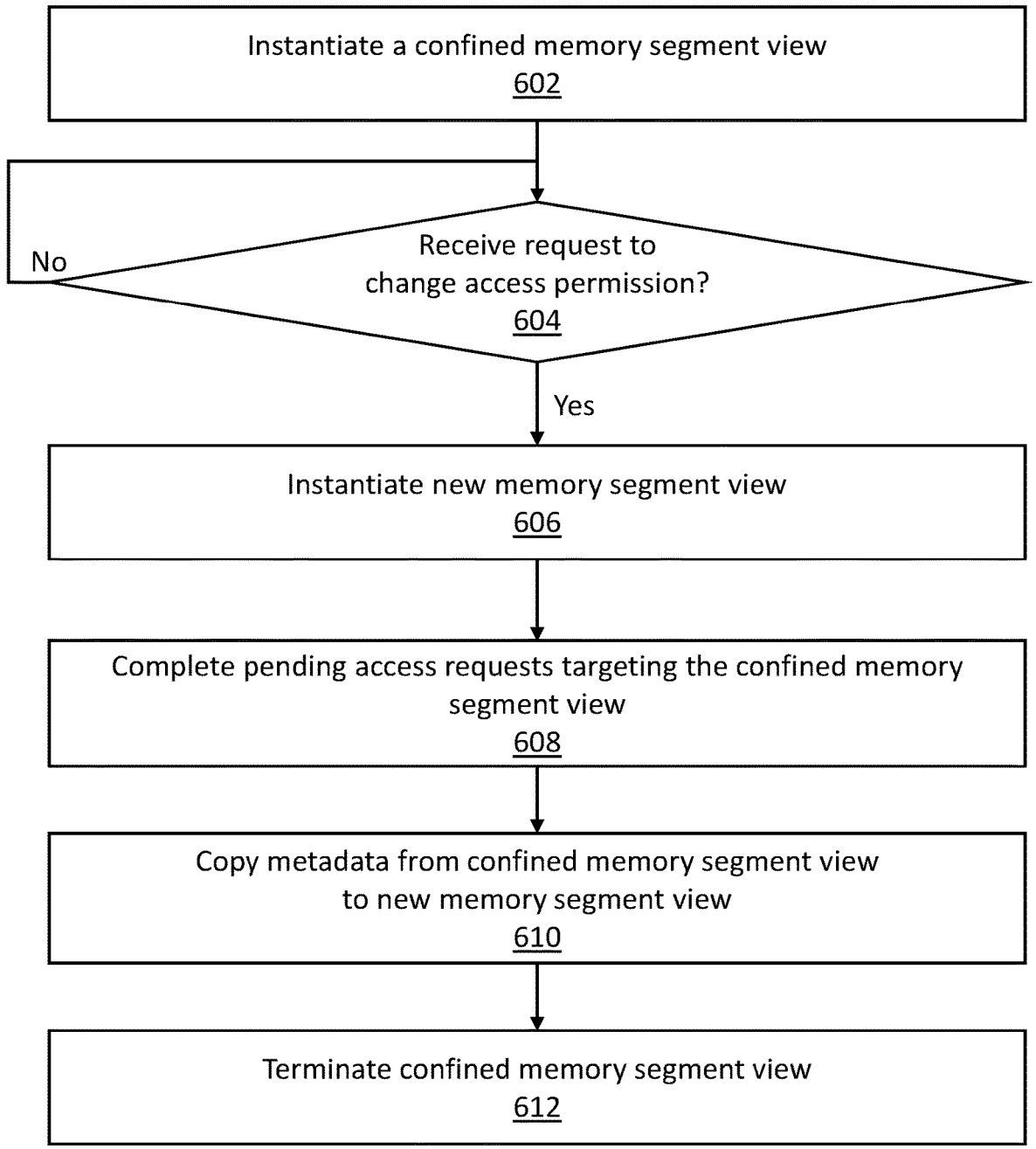
FIG. 6 illustrates a flowchart in accordance with the embodiments.

3.2 Methods for Transitioning Between Thread-Confined Memory Segment Views and Shared Memory Segment Views FIG. 6 shows a method for transitioning between a confined memory segment view and a shared memory segment view. One or more operations illustrated in FIG. 6 may be modified, rearranged, or omitted all together. Additional operations (not illustrated) may be executed. Accordingly, the particular sequence of operations illustrated in FIG. 6 should not be construed as limiting the scope of one or more embodiments.

In an embodiment, a system instantiates a first confined memory segment view (Operation 602). Based on the memory segment view, memory may be allocated. The instantiation of the first confined memory segment view may include a reference to a particular thread requesting the instantiation. A reference to the particular thread can be stored in an owner field corresponding to the first memory segment view. The owner field may be stored as a part of the first memory segment view itself. Alternatively or in addition, the owner field can be stored in a separately-maintained table that includes a mapping between memory segment views and owners. Moreover, the first memory segment view may also store information regarding spatial and/or temporal bounds of the memory, and/or a reference to a segment of memory.

In an embodiment, the system receives a request to change access permissions for the first memory segment view (Operation 604). In some embodiments, the request to change the access permissions may include a request to change the owner of the first memory segment view. The request to change access permissions may include a request to transition the first confined memory segment view from a confined memory segment view accessible to a single owner thread to a shared memory segment view accessible to any thread. Alternatively, the request may be to transition the first confined memory segment view from one single-owner thread to another single-owner thread. Alternatively, the request may specify a particular group of threads that may access the first memory segment view.

In an embodiment, the request to change access includes a reference to the thread making the request to change access to the first memory segment view. The system may validate the request. Validating the request may include verifying that the thread making the request to change access permissions matches the particular thread stored in the owner field corresponding to the first memory segment view. That is, only the owner of the first memory segment view may be permitted to change the access permissions of the memory segment view.

In response to receiving a validated request to change access permissions for the first memory segment view, the system may instantiate a second memory segment view (Operation 606). If the request to change access permissions included a reference to the one or more threads that should become the new owner (e.g., in response to a request to change ownership), instantiating the second memory segment view may include storing the reference in the owner field associated with the second memory segment view. Otherwise (e.g., in response to a request to transition a thread from a confined thread to a shared thread), allocating the second memory segment view may include storing null in the owner field associated with the second memory segment view.

Additionally, the system may cause any pending input/output (I/O) operations that access the first memory segment to complete (Operation 608). That is, the system may commit any pending write operations that reference the first memory segment, and/or may complete any pending read operations that reference the first memory segment.

Following completion of any pending I/O operations that access the first memory segment, the system may copy metadata, including the reference to the first memory segment from the first memory segment view to the second memory segment view (Operation 610). Copying the metadata may include copying one or more properties of the first memory segment view to the second memory segment view. In embodiments, copying metadata includes copying metadata without copying any data from the first memory segment.

Additionally, the system terminates the first memory segment view (Operation 612). Termination includes marking the first memory segment view as inactive. The system may also return, to one or more of the owner of the second memory segment and the thread that requested to change access permissions of the first memory segment, a reference to the second memory segment.

In response to determining that no memory segment view is currently associated with the memory segment, the system may de-allocate the memory segment. That is, the de-allocation of the memory segment may be performed as part of a garbage collection process, rather than being explicitly performed by any of the memory segment views. In some embodiments, the system may rely on an acquisition counter to determine a number of existing memory segment views associated with a memory segment, such that the memory segment may be de-allocated only when the acquisition counter is equal to zero.

In some embodiments, the second memory segment view may be shared with (e.g., owned by) a particular thread pool. The memory segment associated with the memory segment view may be de-allocated directly, but may not be de-allocated until the thread pool that owns the memory segment view is shut down.

3.3 Example Memory Segment View Operations

Figure 7:
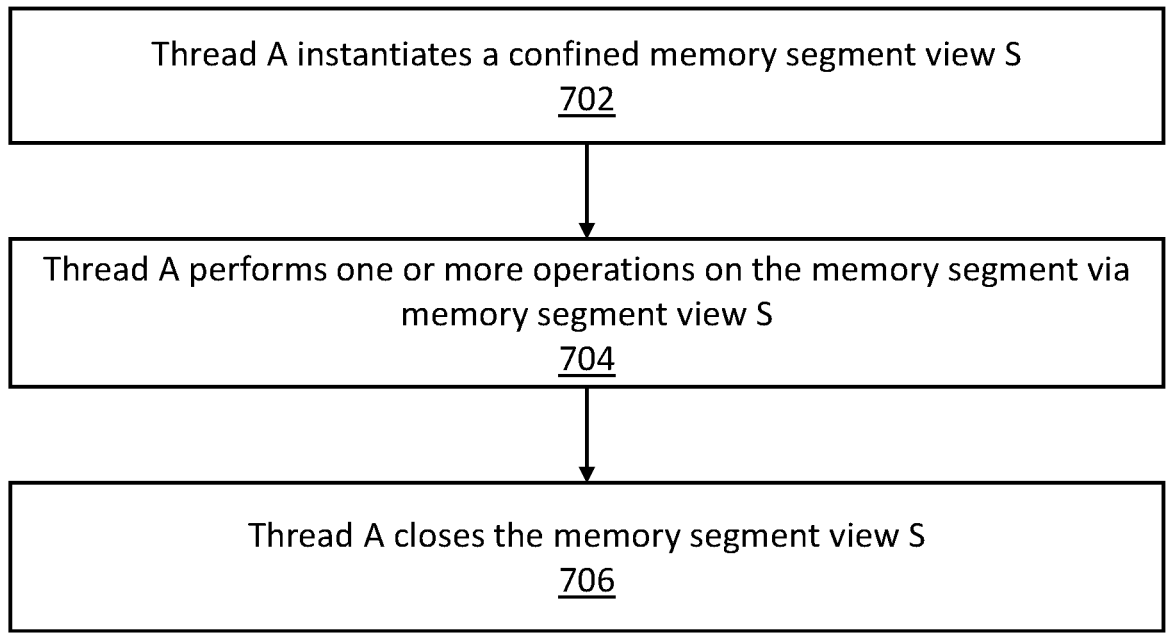
FIG. 7 illustrates an example set of operations using memory segment views in accordance with the embodiments.
Figure 8:
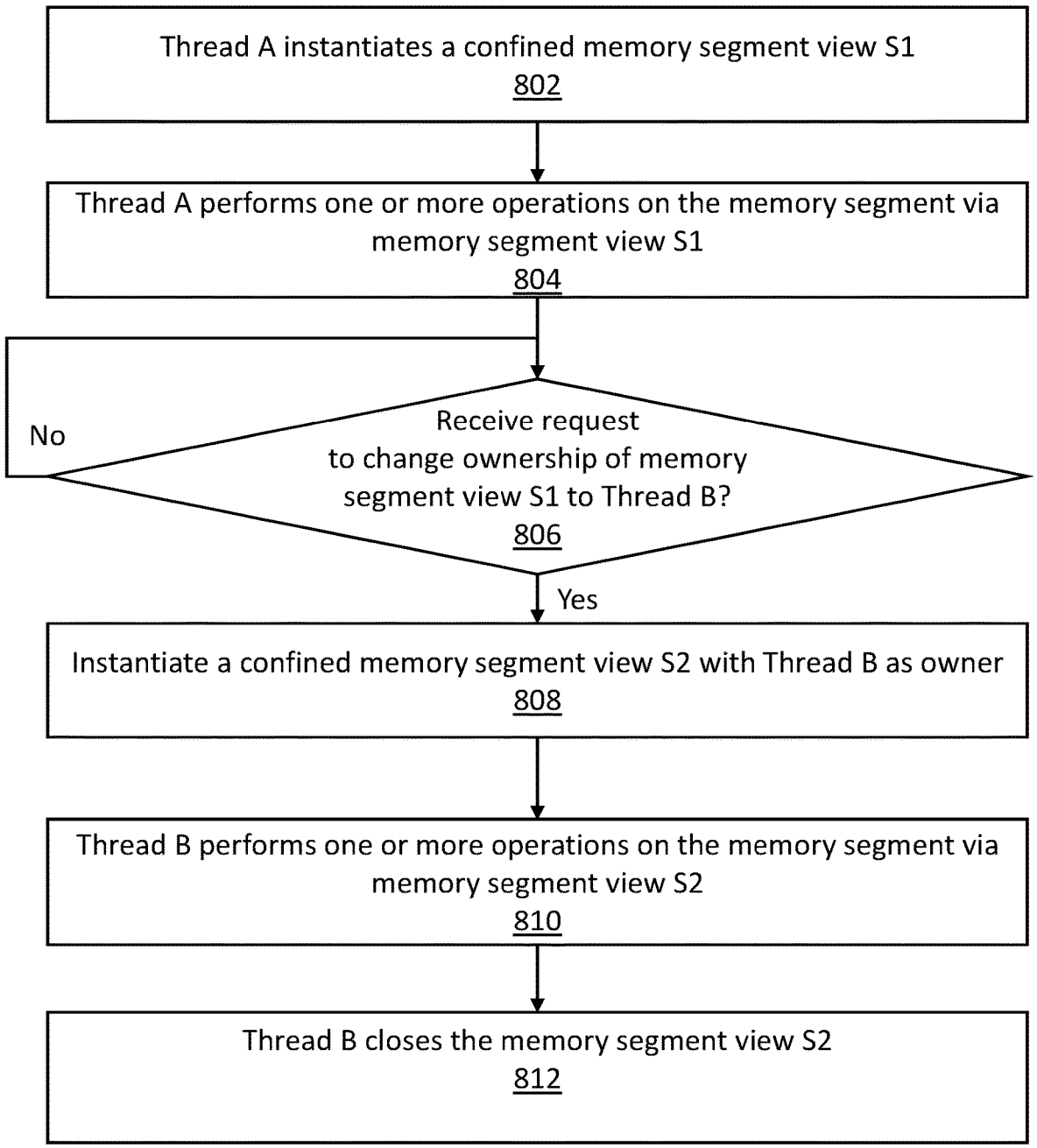
FIG. 8 illustrates an example set of operations using memory segment views in accordance with the embodiments.
Figure 9:
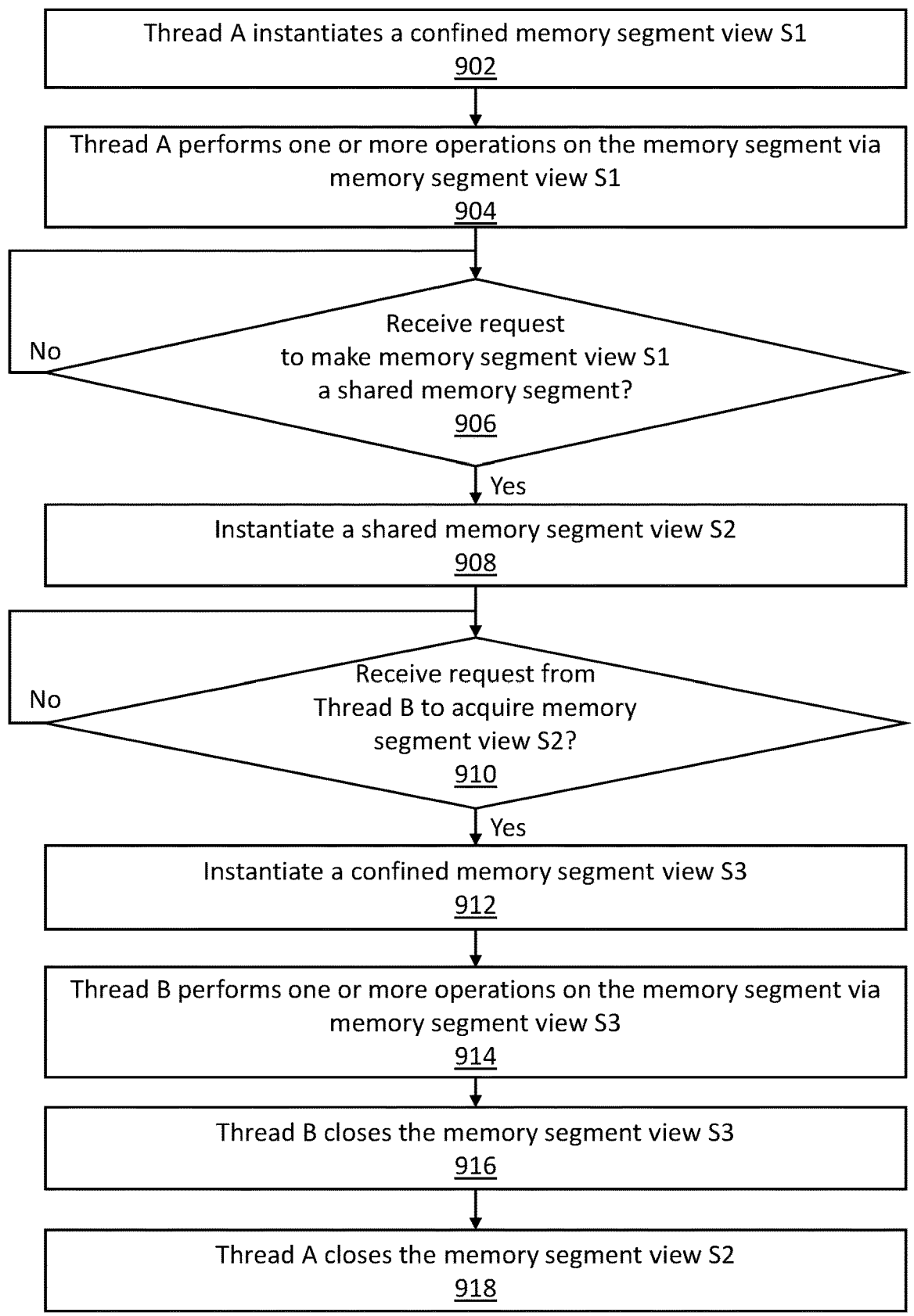
FIG. 9 illustrates an example set of operations using memory segment views in accordance with the embodiments.

FIGS. 7 through 9 show three example operations for use of memory segment views.

FIG. 7 shows an example method for using a static confined memory segment view to access a memory segment. One or more operations illustrated in FIG. 7 may be modified, rearranged, or omitted all together. Additional operations (not illustrated) may be executed. Accordingly, the particular sequence of operations illustrated in FIG. 7 should not be construed as limiting the scope of one or more embodiments.

A thread A may create (instantiate) a memory segment view S (Operation 702). The memory segment view S may be created as a confined memory segment view. Additionally, a memory segment may be allocated associated with the memory segment view S. Creation of the memory segment view S may include storing a reference to thread A in the owner field associated with memory segment view S, and storing a reference to the physical memory segment associated with the memory segment view S.

Thread A may operate on the memory segment via the memory segment view S (Operation 704). The operations may comprise, for example, accessing data stored in the memory segment, writing data to the memory segment, and/or operating on data stored by the memory segment.

Once Thread A has completed all operations on the memory segment (e.g., via the memory segment view S), Thread A may close the memory segment view S (Operation 706). In response to receiving the command to close the memory segment view S, the system may determine that no other memory segment view references the memory segment. Accordingly, the system may de-allocate the memory associated with the memory segment view S as part of closing the memory segment view S.

FIG. 8 shows an example method for transitioning a confined memory segment view from one owner to a different owner. One or more operations illustrated in FIG. 8 may be modified, rearranged, or omitted all together. Additional operations (not illustrated) may be executed. Accordingly, the particular sequence of operations illustrated in FIG. 8 should not be construed as limiting the scope of one or more embodiments.

A thread A may create (instantiate) a memory segment view S1 (Operation 802). The memory segment view S1 may be created as a confined memory segment view. Additionally, a memory segment may be allocated and associated with the memory segment view S1. Creation of the memory segment view S1 may include storing a reference to thread A in the owner field associated with memory segment view S1, and storing a reference to the physical memory segment associated with the memory segment view S1.

Thread A may operate on the physical memory segment via the memory segment view S1 (Operation 804). The operations may comprise, for example, accessing data stored in the memory segment, writing data to the memory segment, and/or operating on data stored by the memory segment.

Once Thread A has completed all operations on the memory segment (e.g., via the memory segment view S), Thread A may request to change ownership of the memory segment S1 (Operation 806). The request to change ownership of the memory segment S1 may include a reference to Thread B.

In response to receiving the request to change ownership, the system can create (instantiate) a new memory segment view S2 (Operation 808). Creation of the memory segment view S2 may include storing the reference to thread B received in the request in the owner field associated with memory segment view S2, and copying the reference to the physical memory segment from the memory segment view S1 to the memory segment view S2. Additionally, the system can mark the memory segment view S1 as inactive, such that any attempt to access the memory segment via the memory segment view S1 will fail.

Thread B may operate on the physical memory segment via the memory segment view S2 (Operation 810). The operations may comprise, for example, accessing data stored in the memory segment, writing data to the memory segment, and/or operating on data stored by the memory segment.

Once Thread B has completed all operations on the memory segment (e.g., via the memory segment view S2), Thread B may close the memory segment view S2 (Operation 812). In response to receiving the command to close the memory segment view S2, the system may determine that no other active memory segment view references the memory segment. Accordingly, the system may de-allocate the memory associated with the memory segment view S2 as part of closing the memory segment view S2.

FIG. 9 shows an example method for transitioning a memory segment view from a confined memory segment view to a shared memory segment view. One or more operations illustrated in FIG. 9 may be modified, rearranged, or omitted all together. Additional operations (not illustrated) may be executed. Accordingly, the particular sequence of operations illustrated in FIG. 9 should not be construed as limiting the scope of one or more embodiments.

A thread A may create (instantiate) a memory segment view S1 (Operation 902). The memory segment view S1 may be created as a confined memory segment view. Additionally, a memory segment may be allocated and associated with the memory segment view S1. Creation of the memory segment view S1 may include storing a reference to thread A in the owner field associated with memory segment view S1, and storing a reference to the physical memory segment associated with the memory segment view S1.

Thread A may operate on the physical memory segment via the memory segment view S1 (Operation 904). The operations may comprise, for example, accessing data stored in the memory segment, writing data to the memory segment, and/or operating on data stored by the memory segment.

Once Thread A has completed all operations on the memory segment (e.g., via the memory segment view S1), Thread A may request to convert the confined memory segment S1 to a shared memory segment view (Operation 906).

In response to receiving the request to convert the memory segment, the system can create (instantiate) a new shared memory segment view S2 (Operation 908). Creation of the shared memory segment view S2 may include storing null in the owner field associated with the shared memory segment view S2, and copying the reference to the physical memory segment from the memory segment view S1 to the shared memory segment view S2. The system can also create an acquisition counter associated with the shared memory segment view S2. The shared memory segment view S2 has no owner, and thus does not allow any thread to access the memory segment directly. Rather, a thread may acquire the memory segment view S2 to access the memory segment referenced by the shared memory segment view. Additionally, the system can mark the memory segment view S1 as inactive, such that any attempt to access the memory segment via the memory segment view S1 will fail.

Thread B may send a request to acquire the shared memory segment view S2 (Operation 910). Acquiring the shared memory segment view allows Thread B to access the memory segment associated with the shared memory segment view S2.

In response to receiving the request to acquire the shared memory segment, the system can create (instantiate) a new memory segment view S3 (Operation 912). The memory segment view S3 can be created as a confined memory segment. Creation of the memory segment view S3 may include storing a reference to thread B in the owner field associated with memory segment view S3, and copying the reference to the physical memory segment from the memory segment view S2 to the memory segment view S3. Additionally, the system can increment the acquisition counter associated with shared memory segment view S2.

Thread B may operate on the physical memory segment via the memory segment view S3 (Operation 914). The operations may comprise, for example, accessing data stored in the memory segment, writing data to the memory segment, and/or operating on data stored by the memory segment.

Once Thread B has completed all operations on the memory segment (e.g., via the memory segment view S3), Thread B may close the memory segment view S3 (Operation 916). In response to receiving the command to close the memory segment view S3, the system may decrement the acquisition counter associated with shared memory segment view S2. Because the shared memory segment view is active, the system does not de-allocate the memory associated with the memory segment view S3 (and memory segment view S2) as part of closing the memory segment view S3. Operations 910-914 may be repeated many times, in serial or concurrently, for many different threads.

Thread A may close the shared memory segment view S2 (Operation 918). In response to receiving the command to close the memory segment view S2, the system may determine that no other active memory segment view references the memory segment (e.g., that the acquisition counter is 0). Accordingly, the system may de-allocate the memory associated with the memory segment view S2 as part of closing the memory segment view S2.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
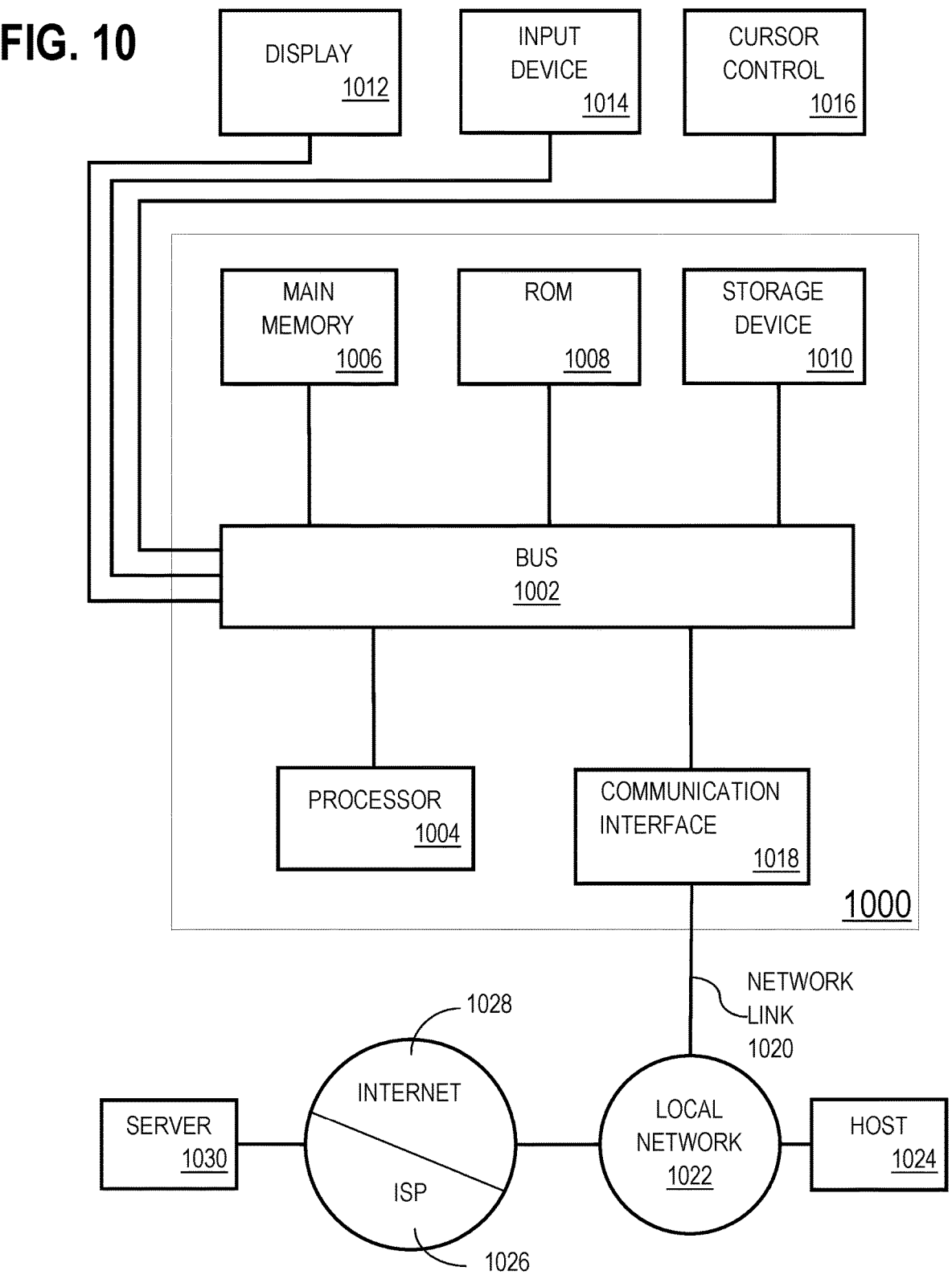
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors cause:
   instantiating a confined memory segment view, wherein the confined memory segment view confines access to a memory segment to a particular thread;
   receiving a request to change access permissions for the confined memory segment to allow access by a first set of one or more threads;
   responsive to receiving the request to change access permissions for the confined memory segment:
   instantiating a new memory segment view, wherein the new memory segment view permits access to the memory segment by the first set of one or more threads;
   copying metadata from the confined memory segment view to the new memory segment view;
   wherein the instantiating and copying operations are executed in response to determining that a requesting entity, corresponding to the request, is referenced by the confined memory segment view as an owner thread; and
   de-allocating the memory segment in response to determining that there are no memory segment views currently associated with the memory segment.

2. The one or more media of claim 1, wherein the confined memory segment view comprises a data structure that defines one or more temporal bounds for access to the memory segment.

3. The one or more media of claim 1, wherein the confined memory segment view comprises a data structure that defines an upper bound address associated with the memory segment and a lower bound address associated with the memory segment.

4. The one or more media of claim 1, wherein the operations further comprise: subsequent to copying the metadata from the confined memory segment view to the new memory segment view, terminating the confined memory segment view to prevent access to the memory segment via the confined memory segment view.

5. The one or more media of claim 1, wherein the operations further comprise:
maintaining a counter corresponding to a number of memory segment views associated with the memory segment.

6. The one or more media of claim 1, wherein the confined memory segment view references the particular thread in an owner field corresponding to the confined memory segment view.

7. The one or more media of claim 1, wherein the first set of one or more threads consists of a second thread, and wherein the new memory segment view is a second confined memory segment view that is confined to access by the second thread.

8. The one or more media of claim 1, wherein the first set of one or more threads consists of a particular plurality of threads defined by the request, and wherein the new memory segment view is a shared memory segment view accessible to the particular plurality of threads.

9. The one or more media of claim 1, wherein the first set of one or more threads comprises all threads, and wherein the new memory segment view is a shared memory segment view accessible to any thread.

10. The one or more media of claim 1, further comprising, prior to copying data from the confined memory segment view to the new memory segment view, completing pending access requests corresponding to the confined memory segment.

11. A method comprising:
instantiating a confined memory segment view, wherein the confined memory segment view confines access to a memory segment to a particular thread;
receiving a request to change access permissions for the confined memory segment to allow access by a first set of one or more threads;
responsive to receiving the request to change access permissions for the confined memory segment:
instantiating a new memory segment view, wherein the new memory segment view permits access to the memory segment by the first set of one or more threads;
copying metadata from the confined memory segment view to the new memory segment view;
wherein the instantiating and copying operations are executed in response to determining that a requesting entity, corresponding to the request, is referenced by the confined memory segment view as an owner thread; and
de-allocating the memory segment in response to determining that there are no memory segment views currently associated with the memory segment;
wherein the method is performed by at least one device including a hardware processor.

12. The method of claim 11, wherein the confined memory segment view comprises a data structure that defines one or more temporal bounds for access to the memory segment.

13. The method of claim 11, wherein the confined memory segment view comprises a data structure that defines an upper bound address associated with the memory segment and a lower bound address associated with the memory segment.

14. The method of claim 11, wherein the operations further comprise:
subsequent to copying the metadata from the confined memory segment view to the new memory segment view, terminating the confined memory segment view to prevent access to the memory segment via the confined memory segment view.

15. The method of claim 11, wherein the operations further comprise: maintaining a counter corresponding to a number of memory segment views associated with the memory segment.

16. The method of claim 11, wherein the confined memory segment view references the particular thread in an owner field corresponding to the confined memory segment view.

17. The method of claim 11, wherein the first set of one or more threads consists of a second thread, and wherein the new memory segment view is a second confined memory segment view that is confined to access by the second thread.

18. The method of claim 11, wherein the first set of one or more threads consists of a particular plurality of threads defined by the request, and wherein the new memory segment view is a shared memory segment view accessible to the particular plurality of threads.

19. The method of claim 11, wherein the first set of one or more threads comprises all threads, and wherein the new memory segment view is a shared memory segment view accessible to any thread.

20. The method of claim 11, further comprising, prior to copying data from the confined memory segment view to the new memory segment view, completing pending access requests corresponding to the confined memory segment.

21. A system comprising:
at least one device including a hardware processor;
the system being configured to perform operations comprising:
instantiating a confined memory segment view, wherein the confined memory segment view confines access to a memory segment to a particular thread;
receiving a request to change access permissions for the confined memory segment to allow access by a first set of one or more threads;
responsive to receiving the request to change access permissions for the confined memory segment:
instantiating a new memory segment view, wherein the new memory segment view permits access to the memory segment by the first set of one or more threads;
copying metadata from the confined memory segment view to the new memory segment view;
wherein the instantiating and copying operations are executed in response to determining that a requesting entity, corresponding to the request, is referenced by the confined memory segment view as an owner thread; and
de-allocating the memory segment in response to determining that there are no memory segment views currently associated with the memory segment.

22. One or more non-transitory machine-readable media storing instructions which, when executed by one or more processors cause:
- instantiating a confined memory segment view, wherein the confined memory segment view confines access to a memory segment to a particular thread;
- receiving a request to change access permissions for the confined memory segment to allow access by a first set of one or more threads;
- responsive to receiving the request to change access permissions for the confined memory segment:
- instantiating a new memory segment view, wherein the new memory segment view permits access to the memory segment by the first set of one or more threads;
- copying metadata from the confined memory segment view to the new memory segment view;
- de-allocating the memory segment in response to determining that there are no memory segment views currently associated with the memory segment; and
- subsequent to copying the metadata from the confined memory segment view to the new memory segment view, terminating the confined memory segment view to prevent access to the memory segment via the confined memory segment view.

* * * * *